United States Patent [19]

Hall

[11] 4,182,121

[45] Jan. 8, 1980

[54] EXHAUST TUNING FOR TRANSVERSE AUTOMOBILE ENGINE

[75] Inventor: John F. Hall, Bloomfield Hills, Mich.

[73] Assignee: Chrysler Corporation, Highland Park, Mich.

[21] Appl. No.: 857,491

[22] Filed: Dec. 5, 1977

Related U.S. Application Data

[62] Division of Ser. No. 735,462, Oct. 26, 1976, abandoned.

[51] Int. Cl.² ......................... F01N 7/10; F02B 27/02
[52] U.S. Cl. ........................................ 60/313; 60/322; 285/136; 285/268
[58] Field of Search ................... 60/313, 323; 285/131, 285/136, 137 R, 184, 268, 275

[56] References Cited

U.S. PATENT DOCUMENTS

| | | | |
|---|---|---|---|
| 908,414 | 12/1908 | Mellin | 285/136 |
| 2,840,394 | 6/1958 | Rohr | 285/268 |

FOREIGN PATENT DOCUMENTS

| | | | |
|---|---|---|---|
| 835820 | 4/1952 | Fed. Rep. of Germany | 285/268 |
| 2452556 | 5/1976 | Fed. Rep. of Germany | 60/282 |

*Primary Examiner*—Douglas Hart

*Attorney, Agent, or Firm*—Baldwin & Newtson

[57] ABSTRACT

The exhaust manifold for a transversely mounted automobile engine terminates adjacent to the engine in an outlet having an articulated connection with the inlet of an exhaust header that terminates in an exhaust pipe discharging to the atmosphere.

The articulated connection comprises an annular coupling portion having a spherical surface at the header inlet seated in sealing engagement with a downstream enlarging conical sealing surface defining the manifold outlet. An annular flange adjacent to the inlet of the header may be seated in sealing engagement against a second sealing surface of the annular coupling portion. The sealing engagements may be maintained by a collar yieldingly urged against the annular flange by spring means that engage the collar at spaced locations on a line parallel to the roll axis of the engine and passing through the center of the first named spherical surface.

Exhaust tuning is accomplished by partitioning the header inlet into separate exhaust passages connected by the coupling with selected exhaust ports of the engine through short manifold conduits. At a predetermined location downstream of the exhaust ports, the separate passages of the header merge.

16 Claims, 8 Drawing Figures

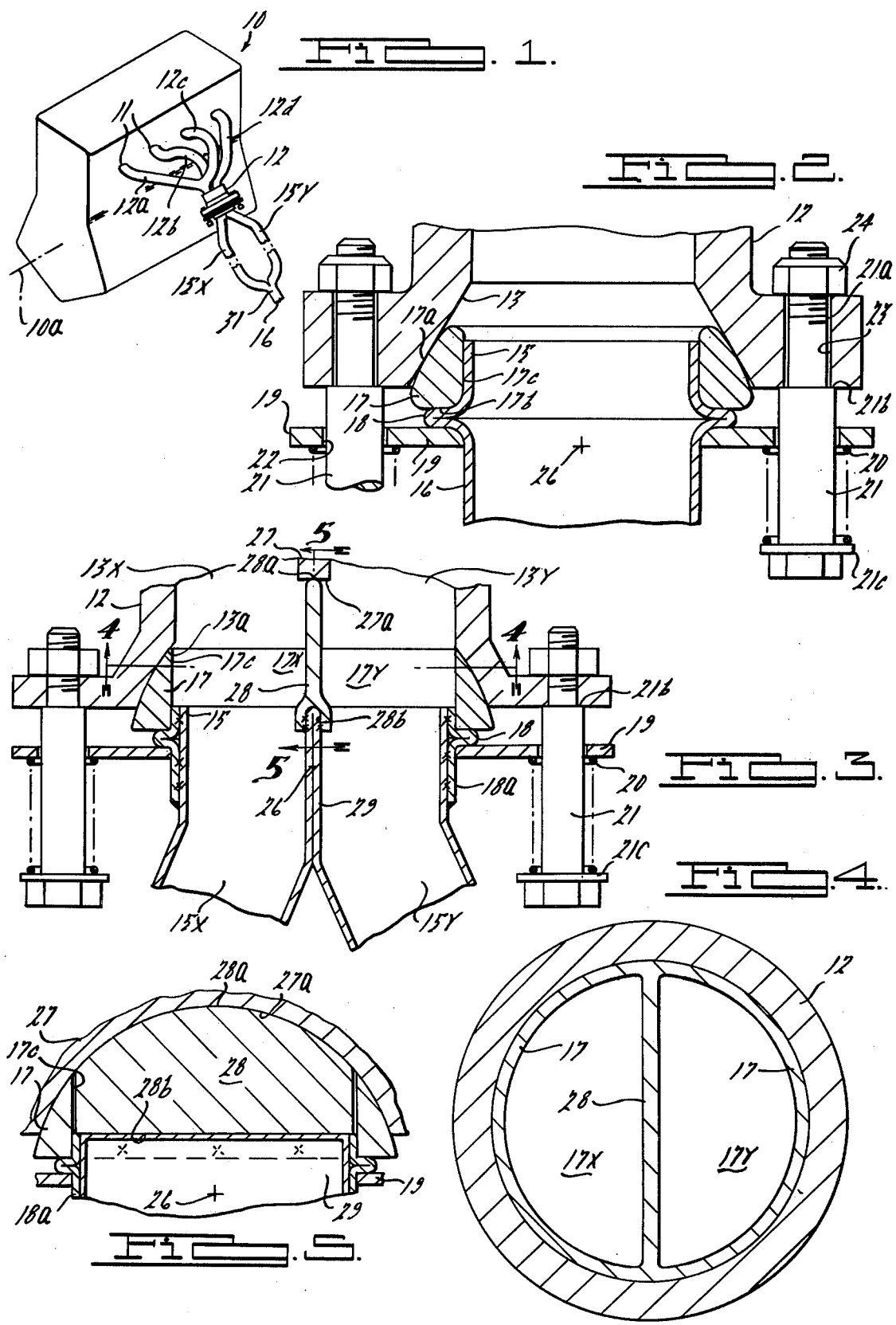

EXHAUST TUNING FOR TRANSVERSE AUTOMOBILE ENGINE

BACKGROUND AND OBJECTS OF THE INVENTION

This application is a division of copending application Ser. No. 735,462, filed Oct. 26, 1976, now abandoned, and is concerned with exhaust tuning for automobiles.

It is illustrated by way of example with a sub-compact vehicle wherein for optimum compactness the engine is mounted with its roll axis transverse to the longitudinal front-to-rear axis of the vehicle. It will be apparent that the invention may be readily employed in other applications.

Exhaust tuning to obtain improved performance from an engine having a pulsating exhaust has been common heretofore, but where the roll axis of the engine is transverse to the longitudinal axis of the exhaust tailpipe, such tuning has been difficult and expensive because of the flexibility required for the exhaust system adjacent the engine. In a preferred exhaust tuning system, each exhaust port is provided with a separate conduit that merges with the conduits of the other ports at a predetermined location downstream of the exhaust ports where a predetermined exhaust pressure phase relationship exists. The expense of the separate exhaust conduits and the corresponding number of articulated connections has prevented exhaust tuning for small low cost engines, such as the four cylinder engines mounted transversely in a sub-compact vehicle.

It is accordingly an object of the invention to provide improved low cost means for exhaust tuning that is suitable but not limited for use with small economical transversely mounted engines and that is particularly efficient and simple in structure, maintenance, and operation.

Another object is to provide such exhaust tuning comprising an exhaust manifold having a separate short manifold conduit connected with each exhaust port of the engine and extending to an outlet for the manifold. The latter is provided with an articulated connection with the inlet end of an exhaust header which is partitioned into a number of header conduits. The header conduits are connected at the articulated connection with selected manifold conduits and merge at a predetermined location downstream of the articulated connection to effect the desired exhaust tuning.

Accordingly each separate short manifold conduit may be connected with a separate header conduit for optimum tuning and only a single leak resistant connection is required. The single connection whether articulated or not, avoids the difficult and costly fabrication required to assure the necessary alignment of multiple connections and to avoid leakage that would result from misalignment of such connections.

In a preferred construction, the header comprises two separate conduits, each connected with selected manifold conduits. Thus with a four cylinder engine for example, the short manifold conduits associated with non-consecutively firing cylinder, such as cylinders 1 and 3, are connected with one header conduit, and the short manifold conduits associated with the cylinders 2 and 4 are connected with the other header conduit, wherein the numbers 1-4 represent the firing order of the cylinders, not necessarily their physical arrangement in the engine. By reason of such a construction, four short manifold conduits and only two of the longer header conduits are required for the exhaust tuning.

Another object is to provide an improved comparatively leak proof articulated connection between the exhaust manifold and header or tailpipe that is particularly suitable for exhaust tuning.

Another object is to provide such a seal comprising a sealing annulus in sealing engagement with annular seats around the manifold outlet and header inlet and characterized by durability, efficiency, and simplicity and economy of construction, replacement and operation, wherein the annulus is provided with a spherical sealing surface in sealing engagement with a downstream enlarging annular sealing surface at the manifold outlet, wherein the inlet end of the header telescopes removably into the annulus and is provided with an annular radially extending sealing flange that seats against an annular sealing surface of the annulus transverse to the latter's major axis, and wherein a collar is yieldingly clamped against the annular flange of the inlet end of the header by spring means that engage the collar at diametrically opposite sides of the center of the spherical sealing surface on a line that extends parallel to the roll axis of the engine.

Other objects of this invention will appear in the following description and appended claims, reference being had to the accompanying drawings forming a part of this specification wherein like reference characters designated corresponding parts in the several views.

FIG. 1 is a diagrammatic view showing a 4-cylinder automobile engine mounted with its roll axis transverse to the longitudinal or fore and aft axis of the vehicle.

FIG. 2 is an enlarged axial section showing details of the articulated connection between the exhaust manifold and exhaust header.

FIG. 3 is a view similar to FIG. 2, illustrating a modification of the invention adopted for engine tuning.

FIG. 4 is a transverse sectional view taken in the direction of the arrows substantially along the line 4—4 of FIG. 3.

FIG. 5 is a sectional view taken in the direction of the arrows substantially along the line 5—5 of FIG. 3.

Figure 6:
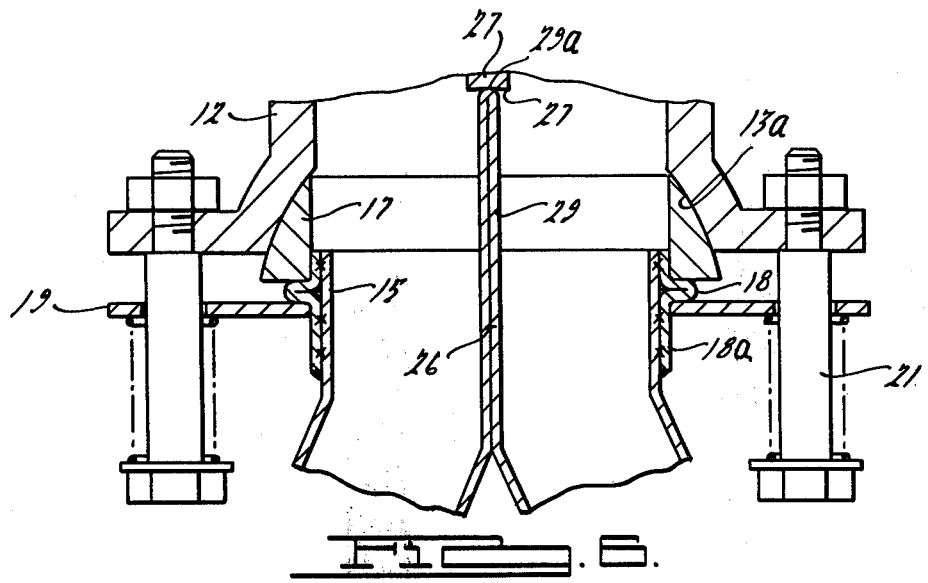
FIGS. 6 and 7 are views similar to FIGS. 3 and 2 respectively, showing modifications.

It is to be understood that that invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

FIG. 1 illustrates the present invention adapted for use with a 4-cylinder engine 10 mounted transversely with respect to the front of rear axis of an automobile, where provision may be made for exhaust tuning. It will be apparent that the invention is not limited to a piston-cylinder type engine and has application with any pulsating engine having multiple exhaust ports. The engine 10 may be conventional and in the present instance has four exhaust ports 11 discharging respectively into four short manifold conduits 12a, 12b, 12c and 12d of an exhaust manifold 12 having an outlet 13, FIG. 2. The four conduits 12a–12d merge at the outlet 13, which is suitably connected by means of an articulated coupling with the inlet 15 of an exhaust header 16.

The outlet 13 is defined by annular conical sealing surface diverging in the downstream direction with respect to the exhaust gas flow. A sealing annulus 17 has a spherical sealing surface 17a seated in sealing relationship at the conical surface 13 and also has an annular transverse sealing surface 17b seated in sealing relationship against the proximate sealing surface of an annular movement limiting and sealing flange 18 of the header 16 adjacent its inlet end 15. The flange 18 extends radially outwardly from the header 16 transversely to the latter's major axis. The interior surface 17c of the annulus 17 is cylindrical and coaxial with the axis of header 16, which axis is perpendicular to the plane of the confronting sealing surfaces 17b and flange 18 and also to the roll axis of the engine 10. The surface 17c fits coaxially and snugly around the cylindrical header inlet end 15.

A clamping collar 19 is yieldingly urged against the side of flange 18 opposite the end 15 by means of a pair of diametrically arranged springs 20 which are held in clamping position by shoulder bolts 21. Each of the bolts 21 extends through a bolt hole 22 in the collar 19, has a screw threaded end 21a of reduced diameter that extends through a hole 23 in the manifold 12 and is secured in position by a nut 24, and has an annular shoulder 21b that seats against the manifold 12. A flange or enlargement 21c provides a spring retainer for the spring 20 to urge the latter against the collar 19.

By the construction described, the shoulder 21b effects a predetermined spacing between the flange 21c and manifold 12 and accordingly maintains a predetermined spring induced compressional force clamping the collar 19 against the flange 18, thereby to clamp the sealing surfaces 17a and 17b between the conical sealing surface 13 and upper transverse surface of the flange 18 respectively to maintain a sealing relationship therebetween. The major axes of the springs 20 at their regions of contact with collar 19 intersect a line parallel to the roll axis 10a of the engine 10 and through the center of curvature 26 of the spherical surface 17a. Thus during rolling motion of the engine 10 about its roll axis 10a, the primary relative movement of the clamped together header 16, annulus 17, and collar 19, with respect to the manifold 12, takes place between the conical surface 13 and spherical surface 17a about a pivot axis comprising the latter line through the center 26, so that flexing and alternate compressing and tensioning of the springs 20 and their consequent failure is reduced to a minimum.

The exhaust header 16 extends rearwardly for several feet, usually through a muffler which is suspended from the undercarriage of the vehicle. Accordingly the inlet end 15 of the header 16 may freely move up and down during the aforesaid rolling of the engine 10 without rupturing the connection or mounting of the header 16 with the vehicle body at or near the muffler. Pitching of the engine 10 about a pitch axis transverse to the roll axis is usually nominal in comparison to the rolling action. Thus the rearwardly extending header 16 has adequate resiliency or flexibility to accommodate such movement without recourse to an articulated junction, such as the spherical surface 17a seated at the conical surface 13. Accordingly instead of the spherical surface 17a illustrated, a cylindrical surface about an axis through 26 and parallel to the roll axis 10a is adequate. The comparatively inconsequential engine pitch is then readily accommodated by torsion in the header 16. The springs 20 are seldom compressed or elongated during such movement. The spherical surface 17a and conical surface 13 are preferred because of the ease with which these surfaces may be fabricated, although the sealing surface 13 can also be spherical.

The manifold 12 may comprise a steel casting and the header 16 may comprise tubular steel stock, whereas the annulus 17 may comprise a softer material such as a sintered powdered metal, graphite impregnated woven steel mesh, or other suitable sealing material capable of withstanding the high exhaust temperature. As the annulus 17 wears with use, the springs 20 maintain the sealing engagement between the sealing surfaces to effect a gas tight seal which in most instances will last for the life of the vehicle without replacement.

FIGS. 3–5 illustrate a modification of the invention adapted for exhaust tuning a four cylinder engine. Instead of the conical sealing surface 13 of FIG. 2, a spherical surface 13a concentric with surface 17a is preferred for the outlet of manifold 12. The outlet 13a and header inlet 15 may be partitioned into a number of separate passages, each connected with selected exhaust ports of the engine 10 to enable exhaust tuning in accordance with conventional practice, depending upon the desired extent and refinement of the tuning. For optimum tuning with a 4-cylinder engine having the four exhaust ports 11, the manifold outlet 13a and header inlet 15 may each be partitioned into four separate exhaust passages, each connected with one of each of the four exhaust ports associated with the conduits 12a–d. In a simplified and less costly system, the outlet 13a and inlet 15 may be partitioned into two passages, each connected with two of the four exhaust ports 12a–d associated with non-consecutively firing cylinders. In other respects, the manifold outlet 13a and annulus 17 cooperate with the flange 18, collar 19, springs 20, and bolts 21 as described above. To simplify fabrication, the flange 18 is crimped from a tubular sleeve portion 18a which fits closely around the inlet 15 and is welded thereto, instead of being crimped from the latter as in FIG. 1.

In FIGS. 3–5, the manifold outlet 13a is partitioned diametrically into two openings or passages 13x and 13y by septums 27 and 28 integral respectively with manifold 12 and inlet 15. Each opening 13x or 13y is in communication with selected exhaust ports of the engine 10. In this situation, each of the two manifold openings is in communication with two engine cylinders that do not fire consecutively. For example, if the cylinders are numbered 1, 2, 3, and 4 according to their firing order, cylinders 1 and 3 will be connected via two of the short manifold conduits 12a and 12c with the manifold opening 13x, and cylinders 2 and 4 will be similarly connected via conduits 12b and 12d with the other manifold opening 13y.

The septum 28 also partitions the annulus 17 diametrically into two passages 17x and 17y in communication respectively with the two outlets 13x and 13y. The diametrical opposite edges of the septum 28 fit closely within the cylindrical surface 17c, FIG. 5, but with a small clearance to accommodate differential thermal expansion between the materials of the annulus 17 and septum 28, which latter may be a steel stamping. In the latter regard, it is important that the septum 28 and annulus 17 are separate and slightly spaced members because the exhaust gas heat is not as readily dissipated from the central septum 28 as from the annulus 17. When the latter members are formed integrally from the same material, the resulting thermal expansion of the hotter septum 28 tends to warp or crack the cooler annulus 17.

The septums 27 and 28 extend transversely to the roll axis 10a and are provided with confronting and closely interfitting spherical surfaces 27a and 28a respectively centered at 26, thereby to effect a gas seal therebetween while enabling the engine 10 to pitch or roll. Also in FIG. 3, the upper or leading edge surface 28a may be comparatively sharp or pointed in the sectional view to effect a surface 28a that wears rapidly against the spherical surface 27a during operation. The septum 28 may thus be dimensioned to effect an initial high friction seal between the surfaces 27a and 28a. After a short wearing-in period, the leading edge 28a wears sufficiently to provide an effective low friction gas seal with the surface 27a.

The downstream edge of the septum 28 is provided with a notch 28b to receive a closely interfitting septum 29 integral with septum 28, as for example by being welded thereto. The septum 29 partitions the header inlet 15 into two separate passages 15x and 15y in communication with the passages 17x, 13x and 17y, 13y respectively. The passages 15x and 15y merge into header 16 at a predetermined downstream location 31, FIG. 1. The header 16 continues thereafter to the customary muffler and exhaust tailpipe. The length of the passages 15x and 15y is determined by the tuning characteristic desired. For optimum exhaust tuning at high speed operation, the conduits 15x and 15y will be comparatively short, whereas for optimum exhaust tuning at slower speeds, these conduits will be somewhat longer.

The header inlet 15 may be formed from two separate pipes, each formed to provide a half round passage similar in cross section to the half round passages 17x and 17y illustrated in FIG. 4 and welded together at their flattened diametrical portions to provide the septum 29, or it may be formed from a single piece of pipe that is cut transversely of its axis along approximately half of its circumference, then bent back on itself to open the cut and effect the side-by-side passages 15x and 15y, FIG. 3, which passages are also formed to half round shapes in section similar to the passages 17x and 17y in FIG. 4, wherein the uncut circumferential portion of the original pipe comprises the leading edge of the septum 29.

FIG. 6 illustrates a construction similar to FIG. 3 except that the septum 28 as a separate sheet metal stamping is eliminated. In its place, the septum 29 is extended to a generally spherical upstream edge 29a in concentric sealing engagement with the spherical surface 27a. In all other respects the structure and operation of the FIG. 6 modification is the same as described in regard to FIG. 3.

Figure 7:
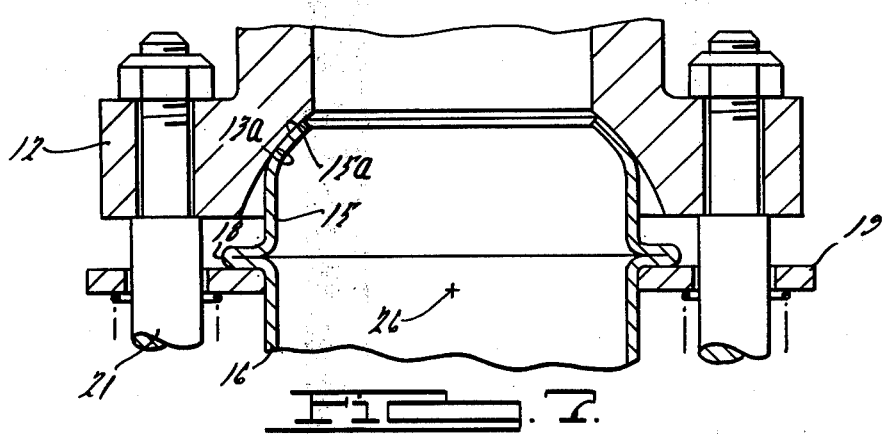

FIG. 7 is a view similar to FIG. 2 except that the conical sealing surface 13 is replaced by the spherical surface 13a centered at 26. Also the sealing annulus 17 is eliminated and replaced by an inturned rounded annular end 15a of the inlet 15, which may also be formed spherically about the center 26 at its areas of contact with 13a, although in this case the spherical seal is not essential for operation. In all other respects, the structure and operation in FIG. 7 is the same as described in regard to FIG. 2.

Figure 8:
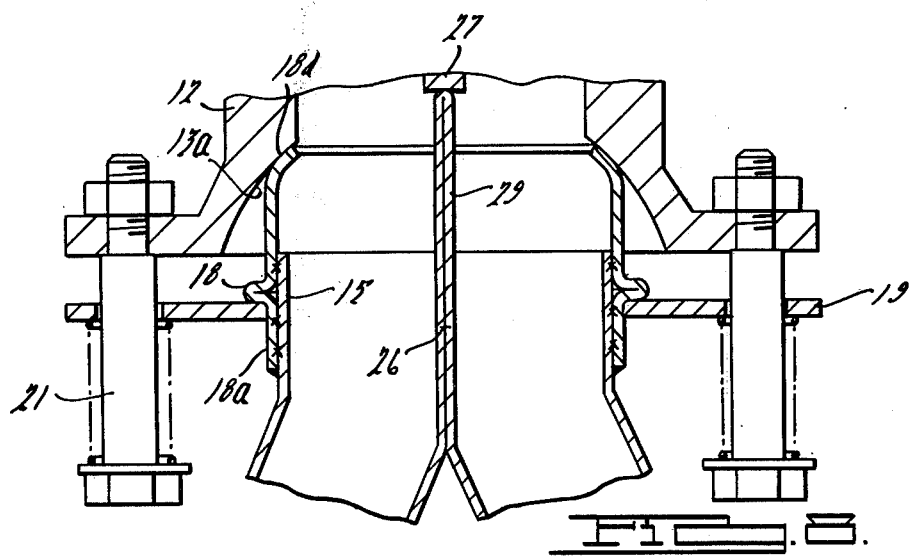
FIG. 8 is a view similar to FIG. 6, showing another modification.

FIG. 8 illustrates a spherical sealing surface 18d similar in all respects to sealing surface 15a of FIG. 7 but formed on an extension of the sleeve 18a and employed with the partitions 27 and 29 of FIG. 6. In all respects, the structure and operation of the parts are the same as the correspondingly numbered parts described above.

I claim:

1. In an exhaust system for an automobile engine having a multiple sequentially operative exhaust port, a gas passage comprising an exhaust manifold which includes a plurality of separate conduits for connecting the exhaust ports with an outlet and for conducting exhaust gases therebetween and further comprising an exhaust header which includes a plurality of separate conduits extending from an inlet and for conducting exhaust gases from the outlet of the manifold to atmosphere, coupling means for connecting the outlet of said manifold with the inlet of said header to effect exhaust tuning for said engine by connecting selected conduits of said manifold at said outlet with selected conduits of said header at said outlet, said selective conduits of said header merging at a predetermined location downstream of said outlet, said exhaust tuning means comprising partition means at said coupling including a first partition at said outlet of the manifold separating the same into two outlet parts, said conduits of said manifold connecting two sets of non-consecutively operative exhaust ports of said engine with two outlet parts respectively, said partition means also comprising a second partition at said inlet of the header separating the same into two inlet parts, said partitions cooperatively engaging to connect one of the inlet parts with one of the outlet parts and connecting the other inlet part with the other outlet part, said coupling means comprising two coupling portions carried by said manifold and header respectively and having sealing surfaces interfitting in sliding sealing relation to effect an articulated connection between the manifold and header, the sealing surfaces of the coupling portion carried by one of the two members comprising said manifold and header being spherical about a center on a line parallel to the roll axis of the engine, resiliently yieldable means urging said sealing surfaces into sliding sealing relationship, flange means carried by said one member, said yieldable means having a yieldable portion engaging said flange means on said line.

2. In the combination according to claim 1, said yieldable means also having a portion fixed with respect to the other of said members.

3. In the combination according to claim 2, said engine comprising a four cylinder piston type engine having a separate exhaust port associated with each cylinder, two of said separate conduits connecting the exhaust ports associated with two non-consecutively firing cylinders being also connected with one of the two outlet parts, and two of said separate conduits connecting the exhaust ports associated with the other two non-consecutively firing cylinders being also connected with the other of said outlet parts.

4. In the combination according to claim 1, said one member comprising said header and carrying said flange means.

5. In the combination according to claim 4, the coupling portion carried by the manifold being annular and its sealing surface comprising its inner surface enlarging in the downstream direction of the exhaust gas flow, said spherical sealing surface being seated within said downstream enlarging inner sealing surface in said sliding sealing relationship.

6. In the combination according to claim 4, said spherical sealing surface comprising an integral portion of said header at its inlet.

7. In the combination according to claim 1, the other sealing surface in said sliding sealing relationship with said spherical sealing surface comprising an interior surface of the outlet of said manifold.

8. In the combination according to claim 7, said other sealing surface being annular and enlarging in the downstream direction of the exhaust gas flow and having said spherical sealing surface seated therein.

9. In the combination according to claim 1, a sealing annulus comprising the coupling portion carried by said one member and having said spherical sealing surface, said annulus also having a transverse annular sealing surface around said passage and transverse to the major axis of said annulus, said flange means having a sealing surface in sealing engagement with said transverse sealing surface, said yieldable means yieldingly engaging said flange means on said line for urging the sealing surface of said flange means into said sealing engagement with said transverse sealing surface.

10. In the combination according to claim 9, said sealing annulus being carried by said header, the sealing surface of the other coupling portion comprising the outlet of said manifold.

11. In the combination according to claim 10, said header having a cylindrical exterior surface extending coaxially into said annulus, said annulus having an inner cylindrical surface interfitting coaxially with said cylindrical exterior surface.

12. In the combination according to claim 1, said partitions having confronting edge surfaces in sliding sealing engagement, one of said edge surfaces being circular therefore about said center.

13. In the combination according to claim 12, the coupling portion carried by said one member comprising a sealing annulus having two annular sealing surfaces around said passage, one of said annular sealing surfaces comprising said spherical sealing surface, said flange means having a sealing surface in sealing engagement with the other of said two sealing surfaces.

14. In the combination according to claim 13, said flange means comprising a flange integral with said header and having its sealing surface in sealing engagement with the other of said two sealing surfaces, said flange means also comprising a collar engaging said flange around said header, and said means for yieldingly urging comprising means yieldingly engaging said collar on said line at opposite sides of said center.

15. In the combination according to claim 14, the major extent of said edge surfaces of said partitions being transverse to said roll axis.

16. In the combination according to claim 5, the other sealing surface in said sliding sealing relationship with said spherical sealing surface comprising an interior surface of the outlet of said manifold.

* * * * *